(12) United States Patent
Fukumasu et al.

(10) Patent No.: US 9,866,127 B2
(45) Date of Patent: Jan. 9, 2018

(54) ELECTRICAL POWER CONVERTING DEVICE

(71) Applicant: Hitachi Automotive Systems, Ltd., Hitachinaka-shi, Ibaraki (JP)

(72) Inventors: Keisuke Fukumasu, Tokyo (JP); Yoshiharu Yamashita, Hitachinaka (JP); Masayoshi Takahashi, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/114,117

(22) PCT Filed: Jan. 26, 2015

(86) PCT No.: PCT/JP2015/052026
§ 371 (c)(1),
(2) Date: Jul. 26, 2016

(87) PCT Pub. No.: WO2015/133201
PCT Pub. Date: Sep. 11, 2015

(65) Prior Publication Data
US 2017/0005581 A1    Jan. 5, 2017

(30) Foreign Application Priority Data

Mar. 3, 2014  (JP) .................................. 2014-040409

(51) Int. Cl.
*H02M 1/00*       (2006.01)
*H02M 3/335*     (2006.01)
(Continued)

(52) U.S. Cl.
CPC ......... *H02M 3/33546* (2013.01); *H02M 1/44* (2013.01); *H02M 3/28* (2013.01);
(Continued)

(58) Field of Classification Search
CPC .................. H02M 7/003; H02M 7/219; H01L 2224/48091; H01L 2924/0014
(Continued)

(56) References Cited

U.S. PATENT DOCUMENTS 6,297,972 B1 * 10/2001 Chen ....................... H02J 9/062
307/64
6,661,659 B2 * 12/2003 Tamba ............... H05K 7/20927
165/80.4
(Continued)

FOREIGN PATENT DOCUMENTS

JP      11-121690      *  4/1999
JP      11-121690 A       4/1999
(Continued)

OTHER PUBLICATIONS

International Search Report (PCT/ISA/210) issued in PCT Application No. PCT/JP2015/052026 dated Apr. 14, 2015 with English translation (Four (4) pages).
(Continued)

*Primary Examiner* — Rajnikant Patel
(74) *Attorney, Agent, or Firm* — Crowell & Moring LLP (57) ABSTRACT

An electrical power converting device includes: a converter circuit part that includes a switching circuit and a transformer and converts a voltage between a voltage on a high voltage power source side and a voltage on a low voltage power source side in an unidirectional or bidirectional manner; a filter circuit part that is connected to a low-voltage side of the converter circuit part and includes an inductor and a capacitor; a control circuit board on which a control part is mounted, the control part controlling the switching circuit; and a metal housing in which an interior space of the housing is divided into a first accommodation space and a second accommodation space by a partition wall including a cooling liquid flow path, wherein the converter circuit part
(Continued)

is arranged in the first accommodation space, and the filter circuit and the control circuit board are arranged in the second accommodation space.

4 Claims, 8 Drawing Sheets

(51) Int. Cl.
| | | |
|---|---|---|
| *H02M 3/28* | (2006.01) | |
| *H02M 7/00* | (2006.01) | |
| *H02M 1/44* | (2007.01) | |
| *B60L 11/18* | (2006.01) | |
| *H02P 27/06* | (2006.01) | |

(52) U.S. Cl.
CPC .......... *H02M 7/003* (2013.01); *B60L 11/1803* (2013.01); *H02P 27/06* (2013.01)

(58) Field of Classification Search
USPC .......... 363/17, 141–146, 132, 134; 361/703, 361/767, 775, 831
See application file for complete search history.

(56) References Cited

U.S. PATENT DOCUMENTS

| | | | |
|---|---|---|---|
| 7,187,568 B2 * | 3/2007 | Radosevich | H02M 1/44 |
| | | | 361/699 |
| 8,462,531 B2 * | 6/2013 | Nishikimi | H05K 7/20927 |
| | | | 361/679.46 |
| 9,425,695 B2 * | 8/2016 | Shinohara | H05K 9/0037 |
| 2013/0100634 A1 | 4/2013 | Okubo et al. | |
| 2015/0194898 A1 | 7/2015 | Shinohara et al. | |

FOREIGN PATENT DOCUMENTS

| | | | |
|---|---|---|---|
| JP | 2006-230046 | * | 8/2006 |
| JP | 2006-230064 A | | 8/2006 |
| JP | 2009-254118 | * | 10/2009 |
| JP | 2009-254118 A | | 10/2009 |
| JP | 2013-90533 A | | 5/2013 |
| JP | 2014-033531 | * | 2/2014 |
| JP | 2014-33531 A | | 2/2014 |

OTHER PUBLICATIONS

Japanese-language Written Opinion International Search Report (PCT/ISA/237) issued in PCT Application No. PCT/JP2015/052026 dated Apr. 14, 2015 (Three (3) pages).

* cited by examiner

ELECTRICAL POWER CONVERTING DEVICE

TECHNICAL FIELD

The present invention relates to an electrical power converting device including a DC-to-DC converter, which is mounted on a vehicle (an electric vehicle or a hybrid vehicle) that is power-driven by an electric motor, for example.

BACKGROUND ART

Electric vehicles and plug-in hybrid vehicles have inverter devices that allow electric motors to be driven by high voltage batteries for power drive, and low voltage batteries for activating accessories of the vehicles such as lights and radios. In this type of vehicle, a DC-to-DC converter device is mounted that converts electrical power for the high voltage battery to that for the low voltage battery or converts electrical power for the low voltage battery to that for the high voltage battery. The C-to-DC converter device includes a high-voltage side switching circuit that converts high-voltage direct current to alternating current, a transformer that converts alternating current high voltage to alternating current low voltage, a low-voltage side switching circuit that converts low alternating voltage to direct current, a filter circuit that reduces noise conduction to the outside of the DC-to-DC converter device, and a control circuit board that generates control signals for controlling the switching circuits, and other components.

In this type of DC-to-DC converter devices, electromagnetic noise (radiation noise) that leaks from the switching circuits and the transformer propagates to the filter circuit and the control circuit board, so that the noise leaks to the outside of the electrical power converting device via harnesses and the like. This electromagnetic noise becomes a problem. A structure having a shielding part for noise shielding provided between noise sources (transformers and switching circuits) and a filter circuit has been proposed as a method of suppressing such a noise propagation (e.g., see PTL1).

CITATION LIST

Patent Literature

PTL1: Japanese Laid-Open Patent Publication No 2013-90533

SUMMARY OF INVENTION

Technical Problem

However, in the configuration according to PTL1, a shielding part is additionally provided in the device housing, which leads to an increase in size of the DC-to-DC converter device. Furthermore, because the housing of the DC-to-DC converter device is generally sealed at the outer edge of a case, it is likely that a gap is left between a shielding wall and a case lid. The gap allows noise to propagate from the switching circuit to the filter circuit and the control circuit board, which causes a reduction in accuracy and malfunction of the control circuit, and also leakage of noise to the outside of the case, for example.

Solution to Problem

According to the 1st aspect of the present invention, an electrical power converting device comprises: a converter circuit part that includes a switching circuit and a transformer and converts a voltage between a voltage on a high voltage power source side and a voltage on a low voltage power source side in an unidirectional or bidirectional manner; a filter circuit part that is connected to a low-voltage side of the converter circuit part and includes an inductor and a capacitor; a control circuit board on which a control part is mounted, the control part controlling the switching circuit; and a metal housing in which an interior space of the housing is divided into a first accommodation space and a second accommodation space by a partition wall including a cooling liquid flow path, wherein the converter circuit part is arranged in the first accommodation space, and the filter circuit and the control circuit board are arranged in the second accommodation space.

Advantageous Effects of Invention

According to the present invention, it is possible to prevent noise propagation to the filter circuit and therefore reduce noise transferred to the outside of the device, while achieving miniaturization of the device housing.

BRIEF DESCRIPTION OF DRAWINGS

FIG. 5 is a view showing electronic components arranged in an accommodation space 11a.

DESCRIPTION OF EMBODIMENTS

Figure 1:
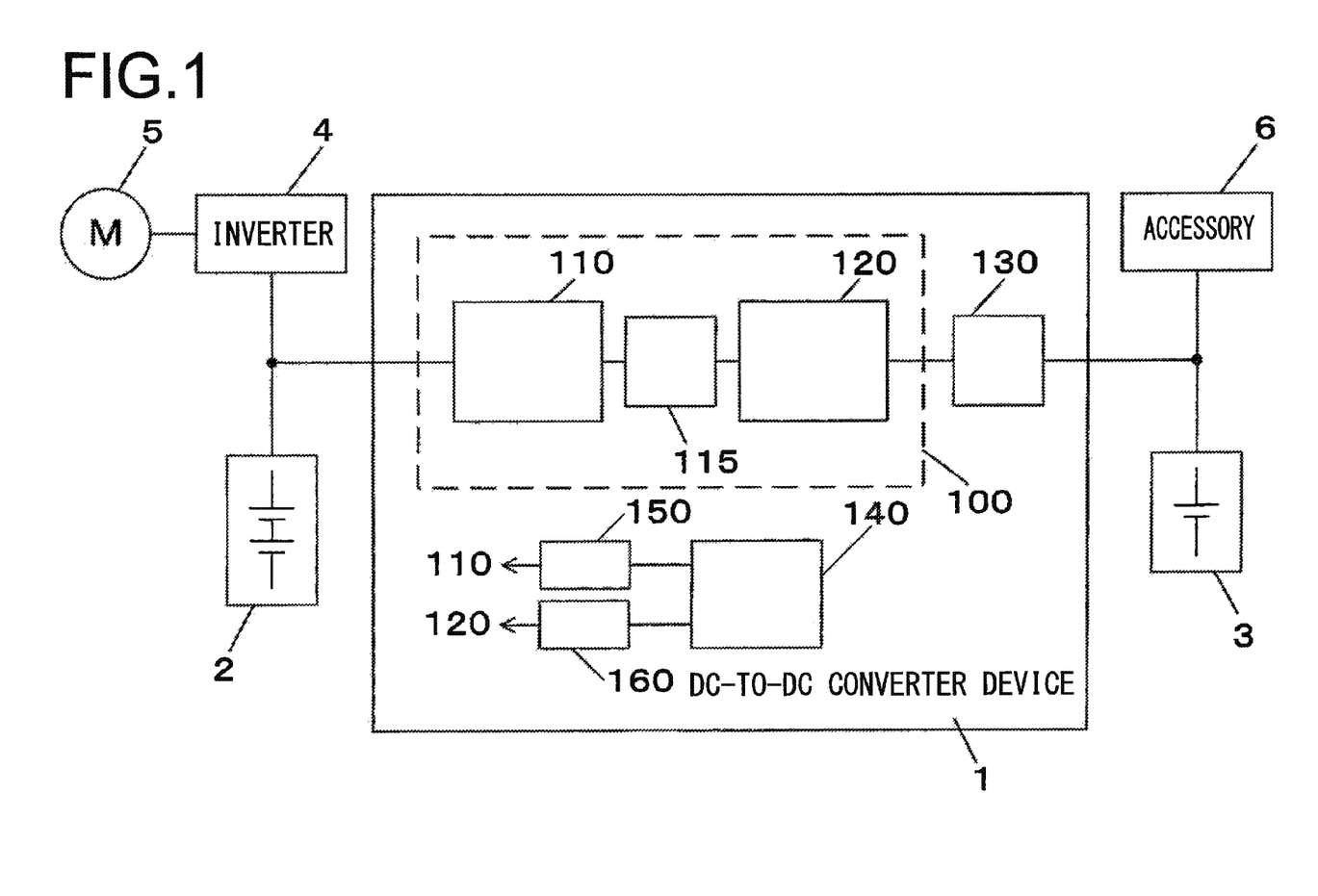
FIG. 1 is a view showing one example of a case where an electrical power converting device according to the present invention is applied to a DC-to-DC converter device of an electric vehicle.

An embodiment of the present invention will now be described, with reference to the drawings. An electrical power converting device according to this embodiment is applied to a DC-to-DC converter device for an electric vehicle or the like as shown in FIG. 1, for example. In FIG. 1, a high voltage battery 2 and a low voltage battery 3 are connected to the DC-to-DC converter device 1 so that electrical power for the the high voltage battery 2 may be converted to that for the low voltage battery 3 or electrical power for the low voltage battery 3 may be converted to that for the high voltage battery 2. An inverter 4 is connected to the high voltage battery 2 and an electric motor 5 is driven by electrical power from the high voltage battery 2. The low voltage battery 3 supplies accessories 6, such as headlights and audio devices, and an accessory control part (not shown) with electrical power.

The DC-to-DC converter device 1 shown in FIG. 1 is a bidirectional DC-to-DC converter as described above and includes: a converter circuit part 100 including a high-voltage side switching circuit part 110, a transformer 115, and a low-voltage side switching circuit part 120; and a filter circuit 130, wherein the filter circuit 130 is provided on a low-voltage side of the converter circuit part 100, that is, an output side of the low-voltage side switching circuit part 120. A driver circuit 150 performs switching control on a plurality of switching elements (see FIG. 2) provided in the high-voltage side switching circuit part 110, on the basis of commands from the control circuit 140. A driver circuit 160 performs switching control on a plurality of switching elements (see FIG. 2) provided in the low-voltage side switching circuit part 120, on the basis of commands from the control circuit 140.

Figure 2:
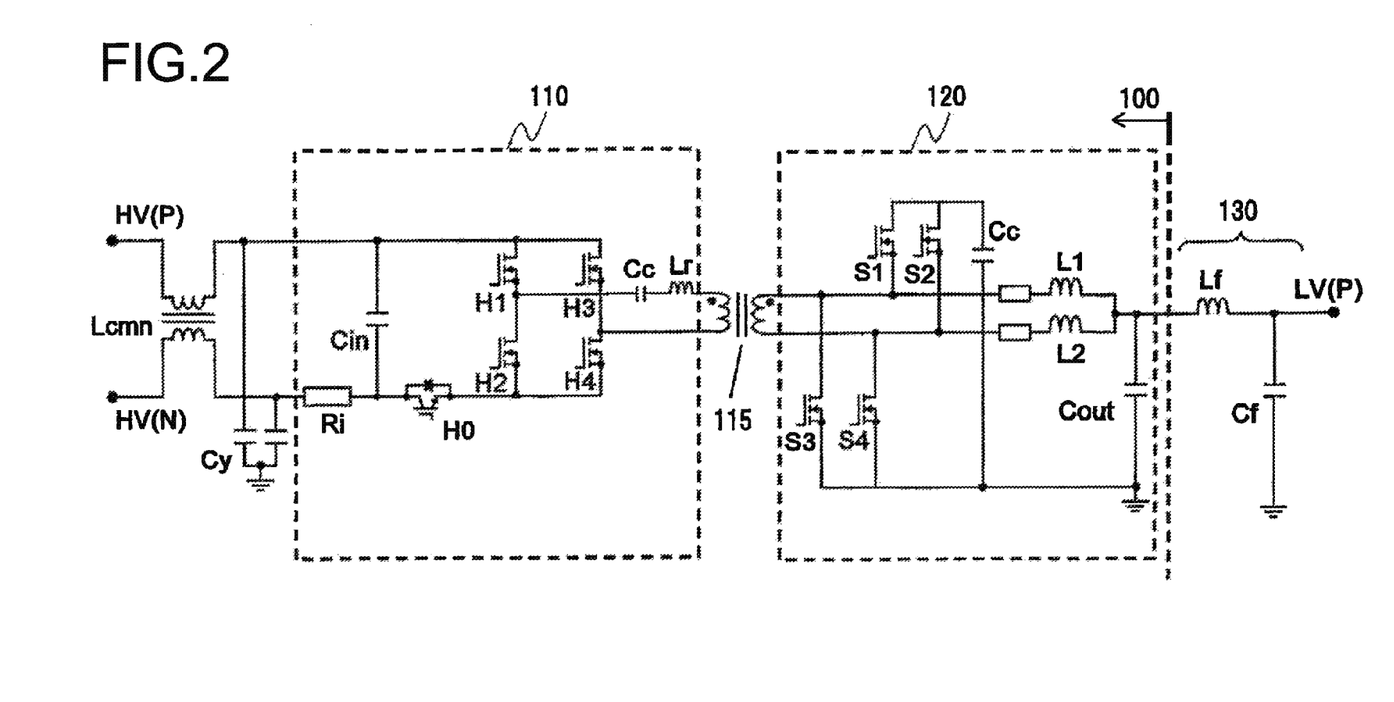
FIG. 2 is a circuit diagram showing one example of a converter circuit part 100 and a filter circuit 130.

FIG. 2 is a circuit diagram showing one example of the converter circuit part 100 and the filter circuit 130. The high-voltage side switching circuit part 110 includes MOS-FETs (switching elements) H1 to H4 which are connected to form a H-bridge type switching circuit, a resonance coil Lr, a capacitor Cc, a smoothing capacitor Cin, an IGBT switch H0, and a shunt resistor Ri which is connected to the IGBT switch H0. The smoothing capacitor Cin is arranged on an input side of the H-bridge type switching circuit to smooth an input electrical current that is input to the high-voltage side switching circuit part 110. Gate resistors (not shown) are connected to gate terminals of the switching elements H1 to H4. These electronic components and other electronic components constituting the high-voltage side switching circuit part 110 are mounted on one and the same high voltage circuit board.

The control circuit 140 can detect an electrical current of the high voltage system by measuring a potential difference across the shunt resistor Ri. A common mode filter Lcmn and a capacitor Cy are provided between a high voltage power source (not shown; the high voltage battery 2 in FIG. 1) and the smoothing capacitor Cin to prevent common mode noise from being conducted to the high voltage power source and battery cables.

The low-voltage side switching circuit part 120 includes MOSFETs (switching elements) S3, S4 which constitute a synchronous rectifying circuit, MOSFETs (switching elements) S1, S2 which constitute an active clamping circuit, reactors L1, L2 which are configured to form a double current circuit of full-wave rectification type (a current doubler), and a smoothing capacitor Cout, in order to provide a high output on the low-voltage side. The filter circuit 130 includes an inductor Lf and a capacitor Cf. Gate resistors of the MOSFETs S1 to S4 are omitted in the figure. The electronic components constituting the low-voltage side switching circuit part 120, except for the reactors L1, 12 and the smoothing capacitor Cout, are mounted on one and the same low voltage circuit board.

The low-voltage side switching circuit part 120 and the reactors L1, L2 form a parallel arrangement of two circuits in a symmetrical manner, in order to provide a high output. Additionally, providing the active clamping circuit constituted of the MOSFETs S1, S2 having freewheeling diodes suppresses generation of a surge voltage at the time of switching to reduce withstand voltages of the switching elements, so that withstand voltages of the circuit components are reduced and miniaturization of the device is achieved.

In the DC-to-DC converter device 1 including the converter circuit part 100 and the filter circuit 130 as shown in FIG. 2, the high-voltage side switching circuit part 110, the transformer 115, and the low-voltage side switching circuit part 120 are sources of leakage flux and switching noise. When radiation noise originating from the high-voltage side switching circuit part 110 and the low-voltage side switching circuit part 120 superimposes onto a signal of a control circuit board 141 (see FIG. 3) on which the control circuit 140 and the driver circuits 150, 160 are mounted, or a signal of the filter circuit 130, the noise causes an increase in conduction noise that is transferred via harnesses of the control circuit board 141 and lines on the low-voltage side to the outside, which adversely affects the control circuit and the like on the accessory side as shown in FIG. 1, for example. In this embodiment, therefore, a housing structure and an arrangement of the electronic components are improved so as to provide a DC-to-DC converter device having little leakage of noise to the outside without an increase in size of the housing.

Figure 3:
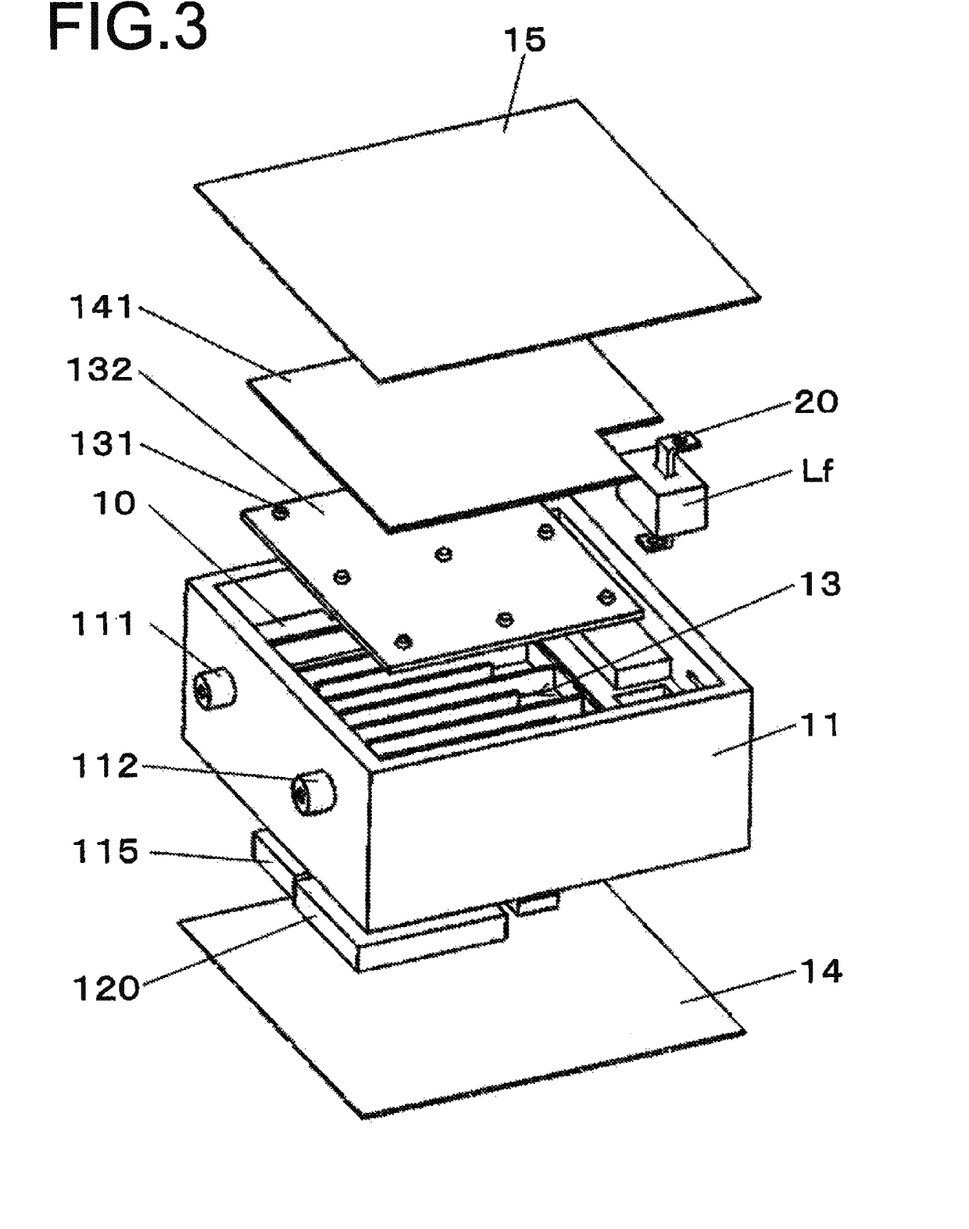
FIG. 3 is an exploded perspective view of the DC-to-DC converter device 1.
Figure 4:
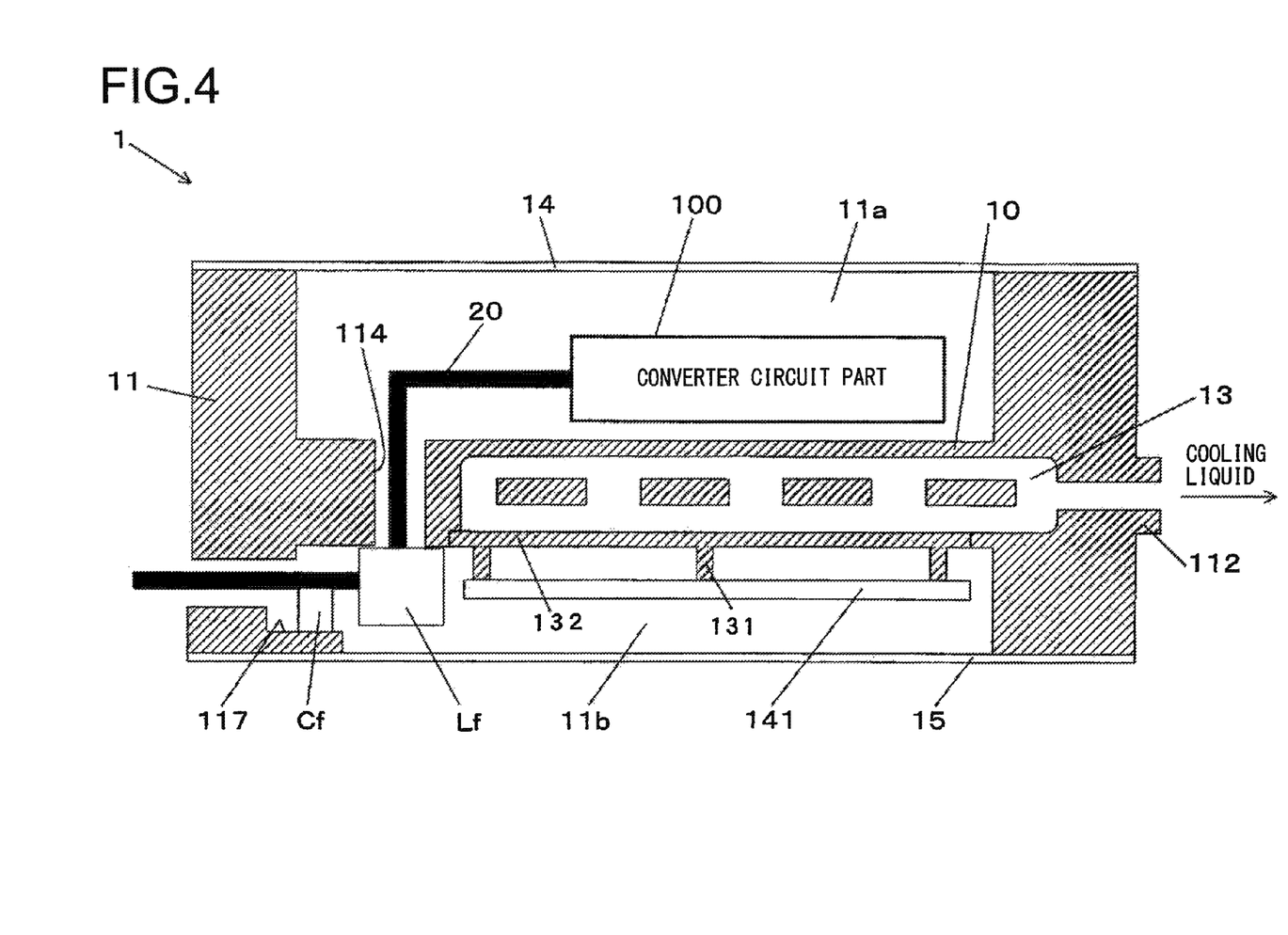
FIG. 4 is a cross-sectional view of the DC-to-DC converter device 1.

FIG. 3 is an exploded perspective view of the DC-to-DC converter device 1. FIG. 4 is a schematic cross-sectional view of the DC-to-DC converter device 1. A housing of the DC-to-DC converter device 1 is constituted of a case body 11, an upper surface case lid 14, and a lower surface case lid 15. Although the housing has a rectangular parallelepiped shape as seen from the outside in this embodiment, the shape is not limited to the rectangular parallelepiped. Additionally, although the case body 11, the upper surface case lid 14, and the lower surface case lid 15 are made of metals, they may be made of other materials that satisfy a part or all of usage environmental conditions. It should be noted that FIG. 3 shows the housing turned upside down, and therefore the lower surface case lid 15 is shown on the upper side of FIG. 3, while the upper surface case lid 14 is shown on the lower side of FIG. 3.

As shown in FIG. 4, a cooling partition wall 10 having a cooling flow path 13 formed therein is formed in the middle of the case body 11 in its up-and-down direction (the up-and-down direction in the figure). Thus, an upper accommodation space 11a above the cooling partition wall 10 and a lower accommodation space 11b below the cooling partition wall 10 are formed in the case body 11. A top opening of the accommodation space 11a is covered by the upper surface case lid 14 and a bottom opening of the accommodation space 11b is covered by the lower surface case lid 15. The accommodation spaces 11a, 11b having the electronic components arranged therein is covered by the metal housing in this way to reduce radiation noise emission to the outside and radiation noise intrusion from the outside.

As shown in FIG. 3, the cooling flow path 13 is formed in the cooling partition wall 10 and a metal partition wall cover 132 covering the cooling flow path 13 is fastened on the lower surface side of the cooling partition wall 10. A seal (not shown), such as an O-ring, is provided between the cooling flow path 13 and the partition wall cover 132 to prevent leakage of a cooling medium. An inflow port 111 for flowing a cooling liquid into the cooling flow path 13 and an outflow port 112 for flowing the cooling liquid out of the cooling flow path 13 are provided on a side wall of the case body 11. A mixture of an antifreeze liquid and water in a ratio of 1:1 is typically suitable as the cooling medium in this embodiment. However, other cooling medium may be used.

Figure 5:
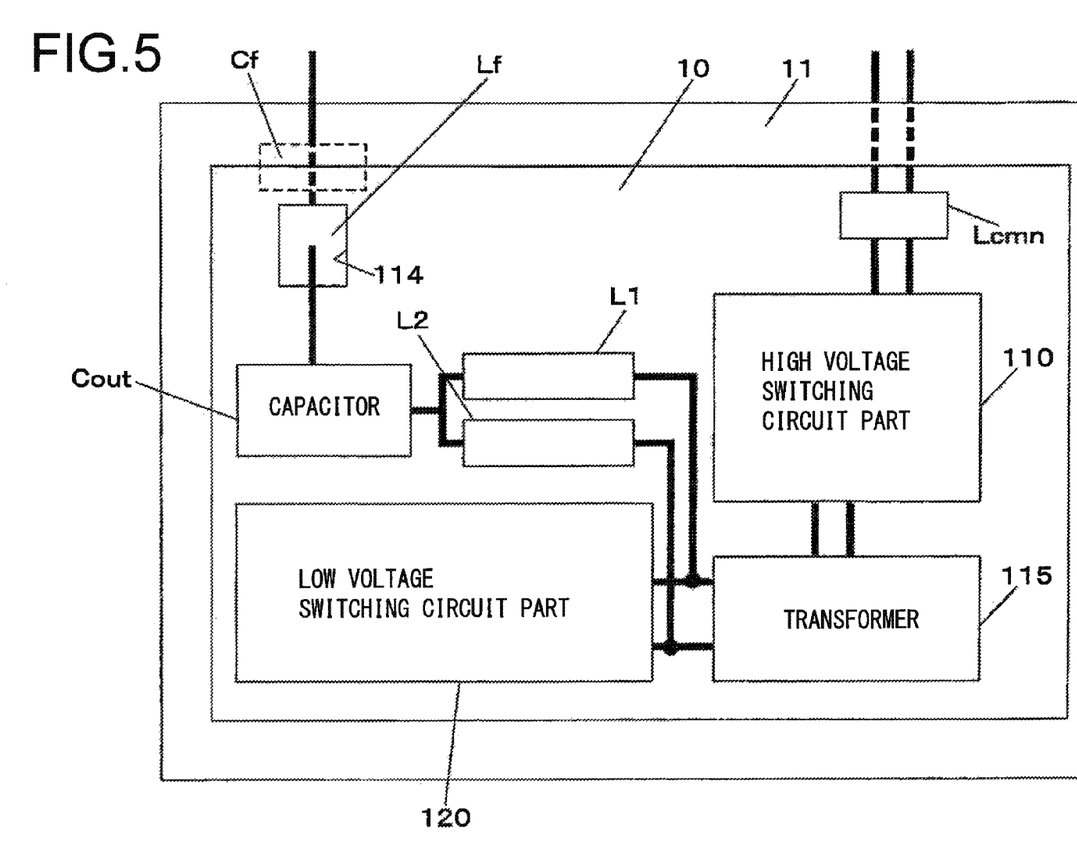

FIG. 5 is a view showing electronic components arranged in the accommodation space 11a, with the upper surface case lid 14 removed. The converter circuit part 100 in FIG. 1, that is, the electronic components from the common mode filter Lcmn to the smoothing capacitor Cout shown in FIG. 2 are arranged in the accommodation space 11a. These electronic components are arranged to be in thermal contact with the cooling partition wall 10. Heat generated by the electronic components is therefore discharged through the cooling partition wall 10 to the cooling medium in the cooling flow path 13. it should be noted that in FIG. 5, the capacitor Cout and the reactors L1, L2 are provided separately from the circuit board on which other components of the low-voltage side switching circuit part 120 are mounted.

Figure 6:
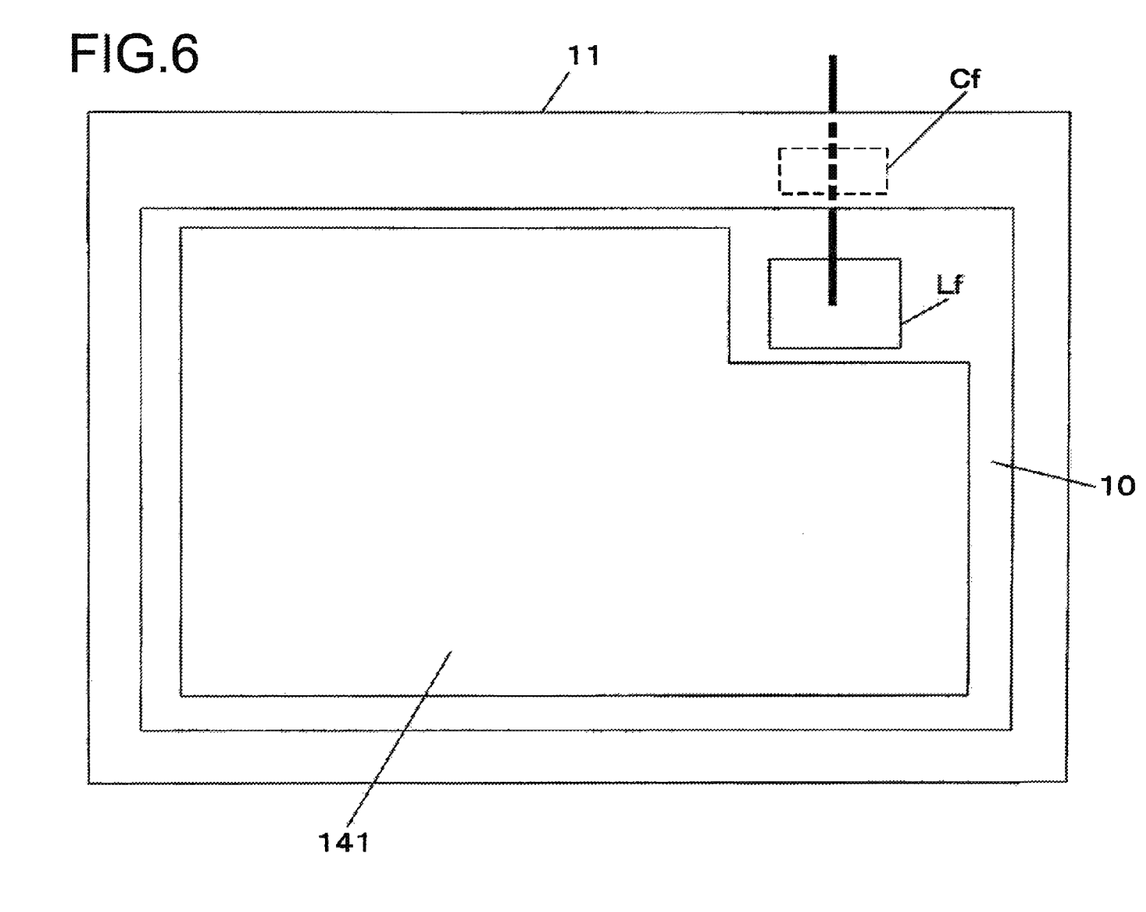
FIG. 6 is a view showing electronic components arranged in an accommodation space 11b.

FIG. 6 is a view showing electronic components arranged in the accommodation space 11b, with the lower surface case lid 15 removed. The control circuit board 141 on which the control circuit 140 and the driver circuits 150, 160 shown in FIG. 1 are mounted, and an inductor Lf and a capacitor Cf which constitute the filter circuit 130 are arranged in the accommodation space 11b.

Thus, in this embodiment, an interior of the housing is divided by the cooling partition wall 10 having the cooling flow path 13 formed therein in order to form two accommodation spaces 11a, 11b divided by the cooling partition wall 10. Furthermore, the high-voltage side switching circuit part 110, the transformer 115, the low-voltage side switching circuit part 120, which are sources of leakage flux and switching noise, are arranged in the accommodation space 11a, while the control circuit board 141 and the filter circuit 130, which should be protected from the influence of radiation noise, are arranged in the accommodation space 11b, which is isolated from the accommodation space 11a by the cooling partition wall 10. In this way, this embodiment can reduce leakage of noise to the outside of the DC-to-DC converter device 1 that is caused by a superimposition of leakage flux and switching noise (radiation noise) onto signals of the filter circuit 130 and the control circuit board 141.

A multilayer printed circuit board is used for the control circuit board 141. The control circuit board 141 is fastened to the partition wall cover 132 which is provided on the lower surface side of the cooling partition wall 10. The partition wall cover 132 is provided with a plurality of bosses 131 having female threads formed therein so that the control circuit board 141 is screwed to the bosses 131. It can of course be possible to fasten the control circuit board 141 on a surface of the partition wall cover, instead of providing the bosses 131. A ground (e.g., a ground pattern) of the control circuit board 141 is electrically connected to the partition wall cover 132. The case body 11 forms the largest conductor in the DC-to-DC converter device 1 and acts as a ground that is most stable in electric potential because the case body 11 is directly screwed on a chassis of a vehicle or connected to the chassis via straps such as metal braided wires.

Thus, the control circuit board 141 can be connected to the stable ground by directly fastening the control circuit board 141 on the cooling partition wall 10 of the case body 11, in order to prevent an increase in electromagnetic noise that leaks from the DC-to-DC converter device 1. Furthermore, because the control circuit board 141 is directly fastened on the cooling partition wall 10 having the cooling flow path 13 formed therein, heat dissipation of electronic components mounted on the control circuit board 141, such as microcomputer, is enhanced.

As described above, the electrical power converting device (DC-to-DC converter device 1) according to this embodiment includes: the converter circuit part 100 that includes the high-voltage side switching circuit part 110, the low-voltage side switching circuit part 120, and the transformer 115 and converts between a voltage on a high voltage power source side and a voltage on a low voltage power source side in an unidirectional or bidirectional manner; the filter circuit 130 that is connected to the converter circuit part 100 on the low-voltage side of the converter circuit part 110 and has the inductor Lf and the capacitor Cf; a control part (the control circuit 140 and the driver circuits 150, 160) that controls the converter circuit part 100; the control circuit board 141 on which the control part is mounted; and a metal housing (the case body 11) in which an interior space of the housing is divided into accommodation spaces 11a and 11b by the cooling partition wall 10 having the cooling flow path 13, wherein the converter circuit part 100 is arranged in the accommodation space 11a, and the filter circuit 130 and the control circuit board 141 are arranged in the accommodation space 11b.

The cooling flow path 13 is provided mainly for the purpose of cooling the converter circuit part 100 and the control circuit board 141. In this embodiment, however, a cooling part having the cooling flow path 13 formed therein is formed as the cooling partition wall 10 in the middle of the case body 11 to prevent radiation noise and leakage flux of the converter circuit part 100 arranged in the accommodation space 11a from intruding into the filter circuit 130 and the control circuit board 141 arranged in the accommodation space 11b. Consequently, the conduction noise from the filter circuit 130 and the control circuit board 141 to the outside of the device can be reduced.

Moreover, the cooling partition wall 10 is generally comparable to a cooling part, which is conventionally formed on a bottom surface of a case body, located in the middle part of the case body 11. The size of the metal housing can be smaller than that of a configuration in which a wall for shielding electromagnetic noise is further added in the conventional manner. Furthermore, because both upper and lower surfaces of the cooling partition wall 10 may be used as cooling surfaces, an installation area of the DC-to-DC converter device 1 may be reduced.

It should be noted that as is the case body 11, the cooling partition wall 10 having the cooling flow path 13 formed therein is made of a metal, but the cooling partition wall 10 may have any shape, thickness, material (raw material), and the like as long as it acts as an electromagnetic shield that can reduce or shield the influence of noise. Moreover, the cooling partition wall 10 may be integrated with the case body 11 as in the embodiment described above or may be separate from the case body 11. Furthermore, the accommodation space 11a and the accommodation space 11b may be sized in accordance with the sizes of circuit boards, circuit elements, and the like that are to be accommodated in the accommodation spaces, for example, and the cooling partition wall 10 is correspondingly positioned in a height direction.

The smoothing capacitor Cout of the converter circuit part 100 arranged in the accommodation space 11a is connected to a metal bus bar 20. The metal bus bar 20, or an electrical power wiring, is in turn connected to a filter circuit 130 arranged in the accommodation space 11b (see FIGS. 3 to 5). The metal bus bar 20 is thus routed from the accommodation space 11a in which the smoothing capacitor Cout is arranged, through an outflow/inflow port 114 provided in the cooling partition wall 10, to the accommodation space 11b side.

In this embodiment, the inductor Lf of the filter circuit 130 is arranged in the vicinity of the outflow/inflow port 114 described above to shield the outflow/inflow port 114 by a magnetic material of the inductor Lf so that the noise reduction effect is enhanced. The outflow/inflow port 114 would otherwise be a path for noise to intrude into the accommodation space 11b. In FIG. 4, the inductor Lf is arranged so as to cover the outflow/inflow port 114 and a gap between the inductor Lf and the cooling partition wall 10 is, therefore, very small. Although there is preferably no gap, some gap may be exist as long as the gap is enough small in size to shield the radiation noise.

Figure 7:
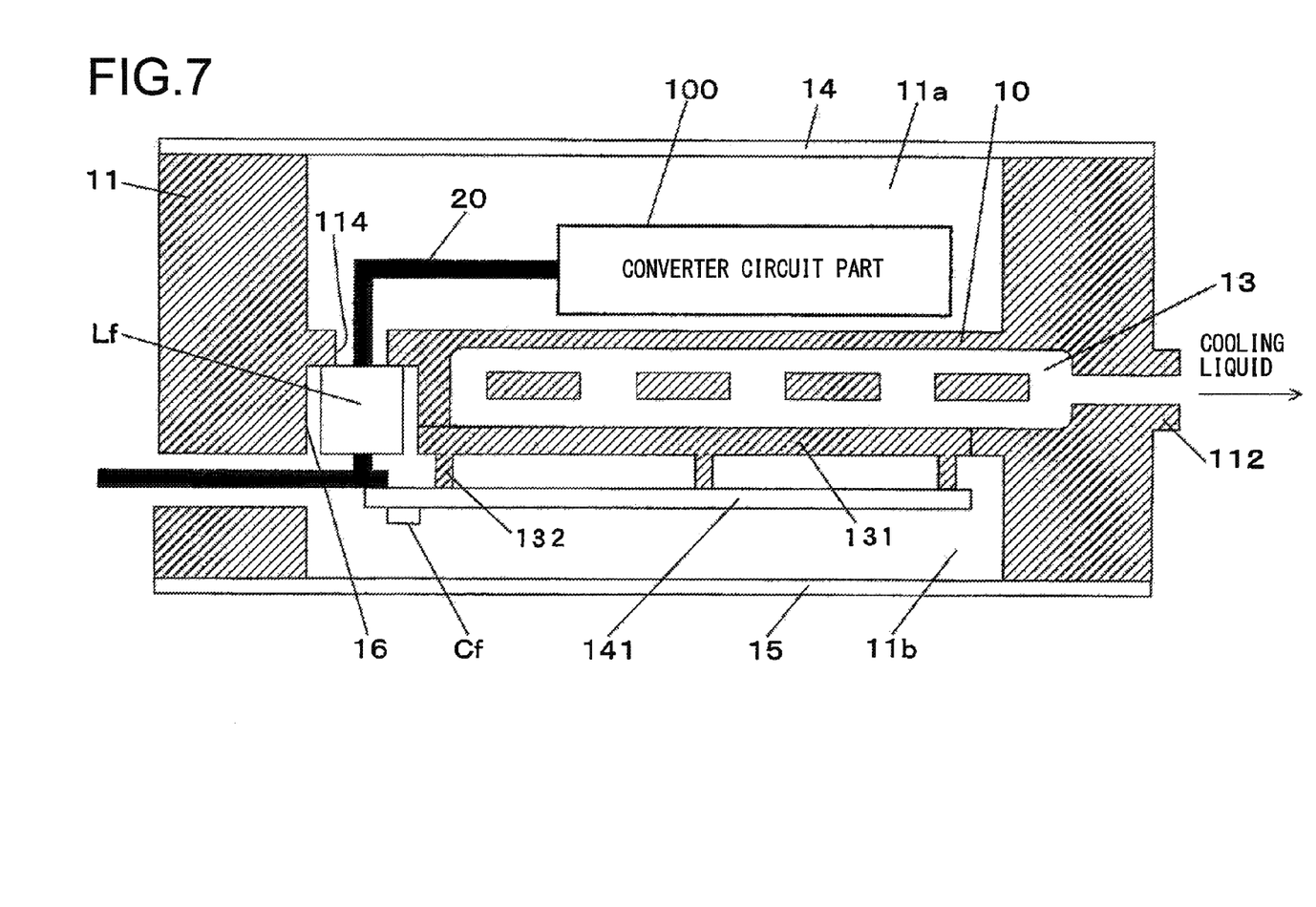
FIG. 7 is a cross-sectional view showing a variation.
Figure 8:
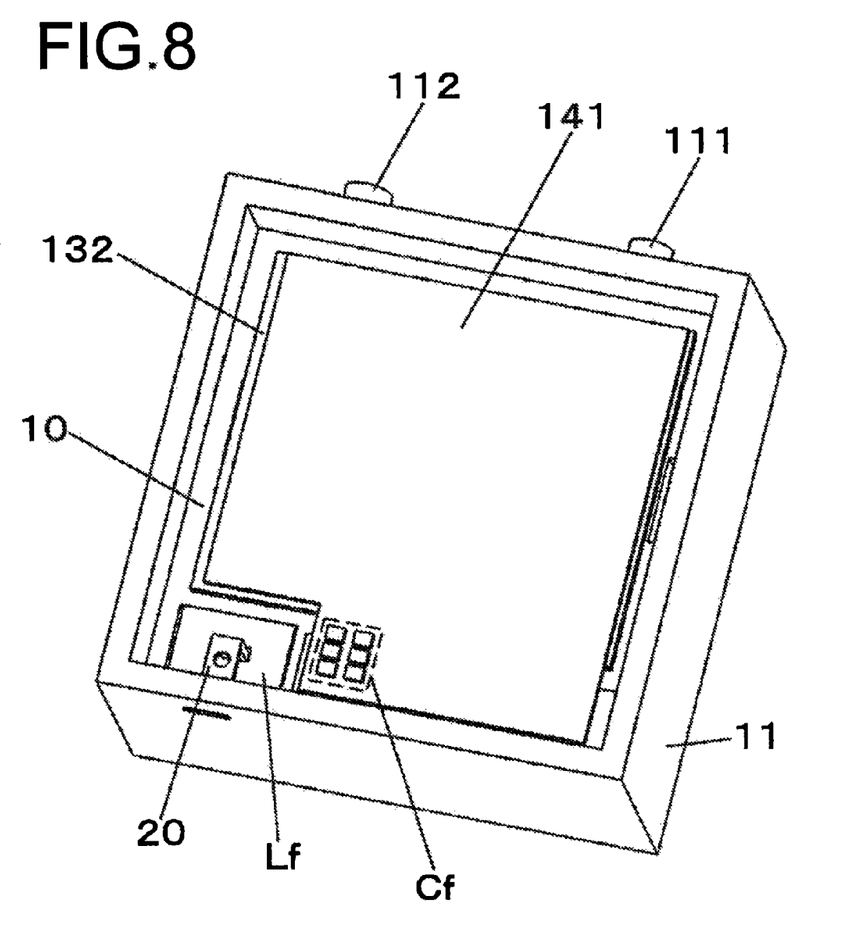
FIG. 8 is a perspective view showing the variation.

FIGS. 7 and 8 are views showing a variation of this embodiment. FIG. 7 is a cross-sectional view and FIG. 8 is a perspective view showing the accommodation space 11b side of the case body 11. In this variation, a recess 16 is formed in a surface on the accommodation space 11b side of the cooling partition wall 10 and the inductor Lf is arranged in the recess 16, as shown in FIG. 7. The outflow/inflow port 114 is formed in a bottom surface of the recess 16 and is covered by the inductor Lf.

In order to prevent magnetic saturation, a gap is formed in a magnetic core of the inductor Lf for noise filtering. Leakage flux caused by the gap can superimpose onto signals of the control circuit board 141 and the capacitor Cf of the filter circuit 130 which are arranged in the accommodation space 11b. However, the superimposition of the leakage flux can be prevented by forming the recess 16 having the outflow/inflow port 114 provided therein on a wall surface of the cooling partition wall 10 that faces the accommodation space 11b and accommodating the inductor Lf in the recess 16 so that the leakage flux is shielded by the cooling partition wall 10, as described above. Furthermore, surrounding the inductor Lf by the cooling partition wall 10 enables a cooling effect of the inductor Lf to be enhanced. An analysis by the present inventors confirmed that noise can be reduced by approximately 20 dB in the case of employing the structure according to the present invention described above, compared with a conventional structure in which noise sources are covered by a shielding wall and an upper lid in order to shield noise radiowaves.

It should be noted that, in order to suppress the adverse influence of the leakage flux of the the inductor Lf on the capacitor Cf, a recess 117 may be formed in the case body 11 and the capacitor Cf is arranged in the recess 117, as shown in FIG. 4.

Furthermore, in the example shown in FIG. 4, a ceramic capacitor is used as the capacitor Cf of the filter circuit 130 and arranged separately from the control circuit board 141. By contrast, in the variation shown in FIGS. 7 and 8, a circuit board for the capacitor Cf may be omitted because the capacitor Cf is mounted on the control circuit board 141. Thus, further miniaturization can be achieved. Moreover, in terms of types of the capacitors, any electrical components that can store charges and have a certain capacitance may be used, such as a plastic film capacitor.

It should be noted that the above description is only exemplary and the present invention is not limited to the above embodiments, unless impairing the features of the present invention. For example, the DC-to-DC converter device 1 merely represents one embodiment of the electrical power converting device of the present invention, and the device may be modified in shape, structure, and the like for practical application. Moreover, the present invention applies to not only DC-to-DC converter devices, but also AC-to-DC converter devices or other devices. Furthermore, the liquid cooling medium flows through the cooling flow path 13 in the above embodiment. Instead, cooling gases such as air may be successfully used for cooling medium.

The disclosure of the following priority application is herein incorporated by reference:

Japanese Patent Application No 2014-40409 (filed Mar. 3, 2014)

REFERENCE SIGNS LIST

1 . . . DC-to-DC converter device, 2 . . . high voltage battery, 3 . . . low voltage battery, 10 . . . cooling partition wall, 11 . . . case body, 11a, 11b . . . accommodation space, 13 . . . cooling flow path, 14 . . . upper surface case lid, 15 . . . lower surface case lid, 16, 117 . . . recess, 100 . . . converter circuit part, 110 . . . high-voltage side switching circuit part, 114 . . . outflow/inflow port, 115 . . . transformer, 120 . . . low-voltage side switching circuit part, 130 . . . filter circuit, 141 . . . control circuit board

The invention claimed is:

1. An electrical power converting device, comprising:
a converter circuit part that includes a switching circuit and a transformer and converts a voltage between a voltage on a high voltage power source side and a voltage on a low voltage power source side in an unidirectional or bidirectional manner;
a filter circuit part that is connected to a low-voltage side of the converter circuit part and includes an inductor and a capacitor;
a control circuit board on which a control part is mounted, the control part controlling the switching circuit; and
a metal housing in which an interior space of the housing is divided into a first accommodation space and a second accommodation space by a partition wall including a cooling liquid flow path, wherein
the converter circuit part is arranged in the first accommodation space, and the filter circuit and the control circuit board are arranged in the second accommodation space,
the partition wall includes an outflow/inflow port through which an electrical power wiring passes, the electrical power wiring connecting the converter circuit part and the filter circuit part; and
the inductor is arranged in a vicinity of the outflow/inflow port.

2. The electrical power converting device according to claim 1, wherein:
a recess is formed in a wall surface of the partition wall facing the second accommodation space, and the outflow/inflow port is provided in the recess; and
the inductor is accommodated in the recess.

3. The electrical power converting device according to claim 1, wherein:
the control circuit board is fastened on the partition wall, and a ground of the control circuit board is electrically connected to the partition wall.

4. The electrical power converting device according to claim 2, wherein:
the control circuit board is fastened on the partition wall, and a ground of the control circuit board is electrically connected to the partition wall.

* * * * *